(12) United States Patent
Sasaki et al.

(10) Patent No.: US 10,388,986 B2
(45) Date of Patent: Aug. 20, 2019

(54) SULFIDE SOLID ELECTROLYTE MATERIAL, POSITIVE ELECTRODE MATERIAL, AND BATTERY

(71) Applicant: Panasonic Intellectual Property Management Co., Ltd., Osaka (JP)

(72) Inventors: Izuru Sasaki, Kyoto (JP); Junichi Hibino, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 198 days.

(21) Appl. No.: 15/484,390

(22) Filed: Apr. 11, 2017

(65) Prior Publication Data

US 2017/0331149 A1    Nov. 16, 2017

(30) Foreign Application Priority Data

May 16, 2016   (JP) .................................. 2016-097557
Jul. 29, 2016    (JP) .................................. 2016-149933

(51) Int. Cl.

| H01M 10/0562 | (2010.01) |
|---|---|
| H01M 4/62 | (2006.01) |
| H01M 4/131 | (2010.01) |
| H01M 4/525 | (2010.01) |
| H01M 4/66 | (2006.01) |
| H01M 10/0525 | (2010.01) |
| H01M 10/052 | (2010.01) |
| H01M 4/02 | (2006.01) |

(52) U.S. Cl.
CPC ....... *H01M 10/0562* (2013.01); *H01M 4/131* (2013.01); *H01M 4/525* (2013.01); *H01M 4/62* (2013.01); *H01M 4/621* (2013.01); *H01M 4/625* (2013.01); *H01M 4/661* (2013.01); *H01M 10/052* (2013.01); *H01M 10/0525* (2013.01); *H01M 2004/028* (2013.01); *H01M 2300/0068* (2013.01)

(58) Field of Classification Search
CPC ................................................ H01M 10/0562
See application file for complete search history.

(56) References Cited

U.S. PATENT DOCUMENTS

| 2012/0301796 A1 | 11/2012 | Ohtomo et al. | |
| 2013/0065135 A1* | 3/2013 | Takada .................. | H01M 4/131 429/322 |

FOREIGN PATENT DOCUMENTS

| JP | 2011-129312 | 6/2011 |
| JP | 2012-094445 | 5/2012 |

OTHER PUBLICATIONS

Machine translation of JP 2012-094445, May 2012.*

* cited by examiner

*Primary Examiner* — Jonathan Crepeau
(74) *Attorney, Agent, or Firm* — McDermott Will & Emery LLP

(57) ABSTRACT

A sulfide solid electrolyte material includes a sulfide phase containing a sulfide material and an oxide phase containing an oxide formed by oxidation of the sulfide material. The oxide phase is located on a surface of the sulfide phase. The sulfide solid electrolyte material satisfies conditions: $1.28 \leq x \leq 4.06$ and $x/y \geq 2.60$, where x denotes the oxygen-to-sulfur elemental ratio measured by XPS depth profiling at the outermost surface of the oxide phase; and y denotes the oxygen-to-sulfur elemental ratio measured by XPS depth profiling at a position 32 nm, estimated from the $SiO_2$ sputtering rate, away from the outermost surface of the oxide phase.

11 Claims, 5 Drawing Sheets

SULFIDE SOLID ELECTROLYTE MATERIAL, POSITIVE ELECTRODE MATERIAL, AND BATTERY

BACKGROUND

1. Technical Field

The present disclosure relates to a sulfide solid electrolyte material, a positive electrode material for a battery, and a battery.

2. Description of the Related Art

Japanese Unexamined Patent Application Publication No. 2011-129312 (Patent Literature 1) discloses a sulfide solid electrolyte material having a structure containing oxygen introduced by using $Li_2O$ as an additive.

Japanese Unexamined Patent Application Publication No. 2012-94445 (Patent Literature 2) discloses a sulfide solid electrolyte particle having an oxide phase formed by self-oxidation on the surface.

SUMMARY

In known techniques, the charge/discharge characteristics of a battery are desired to be further improved.

In one general aspect, the techniques disclosed here feature a sulfide solid electrolyte material including a sulfide phase containing a sulfide material and an oxide phase containing an oxide formed by oxidation of the sulfide material. The oxide phase is located on a surface of the sulfide phase. The sulfide solid electrolyte material satisfies conditions: $1.28 \leq x \leq 4.06$ and $x/y \geq 2.60$, where x denotes the oxygen-to-sulfur elemental ratio measured by X-ray photoelectron spectroscopy (XPS) depth profiling at the outermost surface of the oxide phase, and y denotes the oxygen-to-sulfur elemental ratio measured by XPS depth profiling at a position 32 nm, estimated from the $SiO_2$ sputtering rate, away from the outermost surface of the oxide phase.

The present disclosure can improve the charge/discharge characteristics of a battery.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Embodiments of the present disclosure will now be described with reference to the drawings.

Embodiment 1

Figure 1:
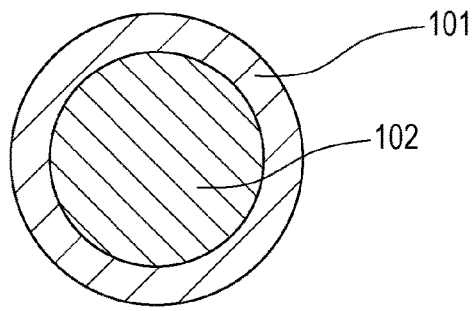
FIG. 1 is a cross-sectional view schematically illustrating the structure of a sulfide solid electrolyte material according to Embodiment 1.

FIG. 1 is a cross-sectional view schematically illustrating the structure of a sulfide solid electrolyte material 1000 according to Embodiment 1.

The sulfide solid electrolyte material 1000 according to Embodiment 1 includes an oxide phase 101 and a sulfide phase 102.

The sulfide phase 102 contains a sulfide material.

The oxide phase 101 contains an oxide formed by oxidation of the sulfide material.

The oxide phase 101 is located on the surface of the sulfide phase 102.

Here, the oxygen-to-sulfur elemental ratio measured by XPS (X-ray photoelectron spectroscopy) depth profiling at the outermost surface of the oxide phase 101 is denoted by "x".

The oxygen-to-sulfur elemental ratio measured by XPS depth profiling at a position 32 nm, estimated from the $SiO_2$ sputtering rate, away from the outermost surface of the oxide phase 101 is denoted by "y".

On this occasion, the sulfide solid electrolyte material 1000 according to Embodiment 1 satisfies conditions: $1.28 \leq x \leq 4.06$ and $x/y \geq 2.60$.

The structure described above can improve the charge/discharge characteristics of a battery.

That is, satisfaction of the condition $1.28 \leq x$ can sufficiently increase the oxygen-to-sulfur elemental ratio at the outermost surface of the sulfide solid electrolyte material (i.e., the outermost layer of the oxide phase 101). In other words, the ratio of oxygen binding can be sufficiently increased in the outermost surface of the sulfide solid electrolyte material. This can sufficiently suppress the electrolysis of the sulfide solid electrolyte material in the outermost surface of the sulfide solid electrolyte material, which may be exposed to high potential by, for example, being in contact with an active material. Therefore, a reduction in ionic conductivity of the sulfide solid electrolyte material due to electrolysis can be suppressed. As a result, deterioration in charge/discharge characteristics of the battery can be suppressed.

Furthermore, satisfaction of the condition $x/y \geq 2.60$ can sufficiently reduce the oxygen-to-sulfur elemental ratio of the oxide phase 101 in the vicinity of the boundary surface where the oxide phase 101 is in contact with the sulfide phase 102. In other words, oxygen binding in the oxide phase 101 can be reduced in the vicinity of the boundary surface where the oxide phase 101 is in contact with the sulfide phase 102. Therefore, the high ionic conductivity can be maintained. As a result, the charge/discharge characteristics of the battery can be further improved.

Furthermore, satisfaction of the condition $x/y \geq 2.60$ (that is, the oxygen-to-sulfur elemental ratio of the oxide phase 101 is reduced in the vicinity of the boundary surface where the oxide phase 101 is in contact with the sulfide phase 102) can reduce the oxygen-to-sulfur elemental ratio of the oxide phase 101 in the vicinity of the boundary surface near to that of the sulfide phase 102. This can continuously change the oxygen-to-sulfur elemental ratio in the boundary surface. As a result, the binding force between the oxide phase 101 and the sulfide phase 102 can be increased. Accordingly, a boundary surface having high adhesion between the oxide phase 101 and the sulfide phase 102 can be formed. As a result, the charge/discharge characteristics of the battery can be further improved.

Furthermore, satisfaction of the condition $x \leq 4.06$ can prevent the oxygen-to-sulfur elemental ratio at the outermost surface of the sulfide solid electrolyte material (i.e., the outermost surface of the oxide phase 101) from excessively increasing. In other words, the ratio of oxygen binding in the outermost surface of the sulfide solid electrolyte material can be prevented from excessively increasing. This can prevent the flexibility of the outermost surface of the sulfide solid electrolyte material from being deteriorated by the presence of excessive oxygen binding. That is, the outermost surface of the sulfide solid electrolyte material can be provided with sufficient flexibility by appropriately reducing the ratio of oxygen binding in the outermost surface. Accordingly, the sulfide solid electrolyte material can be deformed along the shapes of substances, such as the active material particles, being in contact with the sulfide solid electrolyte material. Therefore, a boundary surface having atomic level adhesion can be formed between the sulfide solid electrolyte material and other components, such as the active material particles. That is, the adhesion between the sulfide solid electrolyte material and other components, such as the active material particles, can be improved. As a result, the charge/discharge characteristics of the battery can be further improved.

The details of the above-described effects will now be described by contrast with Patent Literature 1 and Patent Literature 2.

An all-solid lithium secondary battery including a general sulfide solid electrolyte material will now be described as an example. An all-solid lithium secondary battery including a general sulfide solid electrolyte material includes a positive electrode, a negative electrode, and a solid electrolyte layer. The positive electrode contains a positive electrode active material and a sulfide solid electrolyte material. The negative electrode contains a negative electrode active material and a sulfide solid electrolyte material. The sulfide solid electrolyte materials are unstable at high potential or low potential, in particular, at high potential. Accordingly, the sulfide solid electrolyte materials are each electrolyzed at the boundary surface where the sulfide solid electrolyte material is in contact with the active material, which is exposed to high potential. The electrolyzed sulfide solid electrolyte material has significantly low ionic conductivity. As a result, the charge/discharge characteristics of the battery are deteriorated.

The instability of the sulfide solid electrolyte materials at high potential or low potential is caused by that the weak sulfur binding contained in the sulfide solid electrolyte material is cleaved at high potential or low potential.

As a method for suppressing electrolysis of the sulfide solid electrolyte material, for example, oxygen binding having a binding force stronger than that of sulfur binding is introduced. This can improve the stability of the sulfide solid electrolyte material at high potential or low potential.

For example, as disclosed in Patent Literature 1, oxygen binding can be uniformly introduced into a sulfide solid electrolyte material by using $Li_2O$ as an additive and mixing it with the sulfide solid electrolyte material by mechanical milling to synthesize an oxygen binding-introduced sulfide solid electrolyte material. However, in the structure of Patent Literature 1, the oxygen binding density in the particle surface layer, which is in contact with the active material exposed to high potential, is low and is insufficient for suppressing the electrolysis.

When the addition amount of $Li_2O$ is increased for increasing the oxygen binding density in the surface, since the interaction between lithium and oxygen is higher than that between lithium and sulfur, the introduction of a large quantity of oxygen binding in the structure of Patent Literature 1 reduces the lithium conductivity to deteriorate the charge/discharge characteristics.

In addition, for example, as disclosed in Patent Literature 2, electrolysis can be reduced by an oxide phase formed by self-oxidation on the surface (i.e., a sulfide solid electrolyte material having oxygen binding). However, Patent Literature 2 does not refer to the optimum ratio of oxygen binding in the oxide phase in the vicinity of the boundary surface between the oxide phase and the sulfide phase and the optimum ratio of oxygen binding in the outermost surface of the particle.

An excessively high ratio of oxygen binding in the oxide phase in the vicinity of the boundary surface where the oxide phase is in contact with the sulfide phase has a risk of not maintaining high ionic conductivity. Furthermore, it is impossible to continuously change the ratio of oxygen binding in the oxide phase in the vicinity of the boundary surface and the ratio of oxygen binding in the sulfide phase. As a result, a risk of reducing the binding force between the oxide phase and the sulfide phase is caused. Accordingly, a boundary surface having low adhesion between the oxide phase and the sulfide phase is formed. As a result, the charge/discharge characteristics of the battery are deteriorated. However, from such a standpoint, Patent Literature 2 does not refer to the optimum ratio of oxygen binding in the oxide phase in the vicinity of the boundary surface between the oxide phase and the sulfide phase.

In general, regarding the Young's modulus, which is an index of flexibility, oxygen binding has a high Young's modulus, and sulfur binding has a low Young's modulus. For example, $Li_2O$—$P_2O_5$, of which binding is all oxygen binding, has a Young's modulus of about 80 GPa, whereas $Li_2S$—$P_2S_5$, of which binding is all sulfur binding, has a Young's modulus of about 20 GPa. Therefore, a high ratio of oxygen binding in the outermost surface of the particle hardens the outermost surface. As a result, the sulfide solid electrolyte material is not deformed along the shape of the active material particle being in contact with the sulfide solid electrolyte material to reduce the area of the boundary surface where the sulfide solid electrolyte material is in contact with the active material particle. A reduction in the area of the boundary surface increases the resistance and thereby deteriorates the charge/discharge characteristics. In addition, from such a standpoint, Patent Literature 2 does not refer to the optimum ratio of oxygen binding in the outermost surface of the particle.

The sulfide solid electrolyte material 1000 in Embodiment 1 may further satisfy $2.71 \leq x \leq 4.06$ and $x/y \geq 2.60$.

The structure mentioned above can further suppress the electrolysis at the outermost surface of the sulfide solid electrolyte material, which may be exposed to high potential by, for example, being in contact with an active material. This can further improve the charge/discharge characteristics.

In addition, in Embodiment 1, examples of the sulfide material include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$; and those prepared by adding LiX (X: F, Cl, Br, or I), $Li_2O$, $MO_q$, or $Li_pMO_q$ (M: P, Si, Ge, B, Al, Ga, In, Fe, or Zn; and p, q: natural number) thereto.

In Embodiment 1, the sulfide material may be $Li_2S$—$P_2S_5$.

In the above-described structure, $Li_2S$—$P_2S_5$ having high electrochemical stability and high ionic conductivity can be used. Accordingly, the charge/discharge characteristics can be further improved.

Furthermore, in Embodiment 1, the oxygen-to-sulfur elemental ratio at the inside of the sulfide phase 102 may be sufficiently small and be uniform.

In the above-described structure, the sulfide solid electrolyte material can maintain higher ionic conductivity.

Furthermore, in Embodiment 1, the oxide phase 101 may be a layer formed by oxidation of the sulfide material contained in the sulfide phase 102. For example, when the sulfide material contained in the sulfide phase 102 is $Li_2S$—$P_2S_5$, the oxide phase 101 has a structure formed by oxidation of $Li_2S$—$P_2S_5$. Herein, the term "oxidation" means that "sulfur binding of the sulfide material contained in the sulfide phase is partially or entirely replaced by oxygen binding". For example, when the sulfide phase 102 is of $Li_2S$—$P_2S_5$, the main structure of sulfur binding is $PS_4^{3-}$, in which four sulfur atoms bind to one phosphorus atom. In this case, the sulfur binding of $PS_4^{3-}$ is partially or entirely replaced by oxygen binding, and the oxide phase 101 can contain $PS_3O^{3-}$, $PS_2O_2^{3-}$, $PSO_3^{3-}$, and $PO_4^{3-}$ structures.

Furthermore, in Embodiment 1, the oxygen-to-sulfur elemental ratio may stepwise decrease from the outermost surface of the oxide phase 101 toward the vicinity of the boundary surface where the oxide phase 101 is in contact with the sulfide phase 102.

The above-described structure can avoid a sharp change in elements in the oxide phase 101. This can increase the binding force in the oxide phase 101. As a result, a boundary surface adhering to the oxide phase 101 can be formed.

The oxygen-to-sulfur elemental ratio from the surface of the sulfide solid electrolyte material 1000 (e.g., the surface layer of a particle) to the inside of the sulfide solid electrolyte material 1000 can be measured by a combination of etching with C60 cluster ions and XPS analysis.

In addition, the sulfide solid electrolyte material 1000 in Embodiment 1 may have any shape, such as acicular, spherical, or oval spherical shape. For example, the sulfide solid electrolyte material 1000 in Embodiment 1 may be a particle.

For example, if the sulfide solid electrolyte material 1000 in Embodiment 1 has a particle shape (e.g., spherical shape), the median diameter may be 0.1 μm or more and 100 μm or less.

A median diameter of less than 0.1 μm enlarges the ratio of the oxide phase 101 to the sulfide solid electrolyte material 1000. This reduces the ionic conductivity. In contrast, a median diameter of larger than 100 μm has a risk of failing to form a good dispersion state of the sulfide solid electrolyte material 1000 and other components, such as the active material, in the positive electrode or the negative electrode. Therefore, the charge/discharge characteristics are deteriorated.

In Embodiment 1, the median diameter may be 0.5 μm or more and 10 μm or less.

The above-described structure can further enhance the ionic conductivity. In addition, it is possible to form a better dispersion state of the sulfide solid electrolyte material and other components, such as the active material.

Furthermore, in Embodiment 1, the sulfide solid electrolyte material 1000 may have a median diameter smaller than that of the active material.

The above-described structure can form a better dispersion state of the sulfide solid electrolyte material and other components, such as the active material.

In addition, in Embodiment 1, for example, when the sulfide solid electrolyte material 1000 has a particle shape (e.g., spherical shape), the oxide phase 101 may have a thickness of 1 nm or more and 300 nm or less.

A thickness of the oxide phase 101 of smaller than 1 nm has a risk of incomplete prevention of cleavage of sulfur binding in the surface layer of the particle. In contrast, a thickness of the oxide phase 101 of larger than 300 nm increases the ratio of the oxide phase 101 to the sulfide solid electrolyte material 1000, resulting in a significant reduction in ionic conductivity.

The oxide phase 101 may have a thickness of 5 nm or more and 50 nm or less.

In the above-described structure, cleavage of sulfur binding in the surface of the sulfide solid electrolyte material can be further highly suppressed by adjusting the thickness of the oxide phase 101 to be 5 nm or more. A thickness of the oxide phase 101 of 50 nm or less reduces the ratio of the oxide phase 101 to the sulfide solid electrolyte material 1000. This can further enhance the ionic conductivity.

Herein, the term "thickness of oxide phase 101" is defined as "depth at which the oxygen-to-sulfur elemental ratio is $(x-z)/4$ (estimated from the $SiO_2$ sputtering rate)", where "x" denotes the oxygen-to-sulfur elemental ratio measured by XPS depth profiling at the outermost surface of the particle, and "z" denotes the oxygen-to-sulfur elemental ratio at the sulfide phase 102.

<Method of Producing Sulfide Solid Electrolyte Material>

The sulfide solid electrolyte material 1000 in Embodiment 1 can be produced by, for example, the following process.

A sulfide solid electrolyte material including a sulfide phase 102 only, before formation of an oxide phase 101, is used as a precursor. The precursor is placed in an electric furnace controlled to an appropriate oxygen partial pressure.

Subsequently, oxidation treatment is carried out by heat treatment at an appropriate temperature for an appropriate time. This can provide a sulfide solid electrolyte material 1000 having an oxide phase 101 as the surface layer of the particle.

The oxygen partial pressure may be controlled by using oxygen gas. Alternatively, an oxidizing agent that releases oxygen at a certain temperature may be used as an oxygen source. For example, the degree of oxidation treatment (i.e., the oxygen-to-sulfur elemental ratio in the oxide phase 101) can be controlled by adjusting, for example, the addition amount of the oxidizing agent (such as $KMnO_4$), the installation location of the oxidizing agent, and the filling condition of the oxidizing agent.

Embodiment 2

Embodiment 2 will now be described. The explanation duplicated with Embodiment 1 is appropriately omitted.

A battery in Embodiment 2 is constituted using the sulfide solid electrolyte material 1000 described in Embodiment 1.

The battery in Embodiment 2 includes the sulfide solid electrolyte material 1000, a positive electrode, a negative electrode, and an electrolyte layer.

The electrolyte layer is disposed between the positive electrode and the negative electrode.

At least one of the positive electrode, the electrolyte layer, and the negative electrode contains the sulfide solid electrolyte material 1000.

The above-described structure can improve the charge/discharge characteristics of the battery.

Furthermore, in Embodiment 2, at least one of the positive electrode and the negative electrode may contain the sulfide solid electrolyte material 1000.

The above-described structure can further suppress electrolysis at the boundary surface where the sulfide solid electrolyte material is in contact with an active material. This can further improve the charge/discharge characteristics of the battery.

Furthermore, in Embodiment 2, the positive electrode may contain the sulfide solid electrolyte material 1000.

The above-described structure can further suppress electrolysis at the boundary surface where the sulfide solid electrolyte material is in contact with the active material in the positive electrode, which is significantly influenced by electrolysis. This can further improve the charge/discharge characteristics of the battery.

An example of a battery in Embodiment 2 will now be described.

Figure 2:
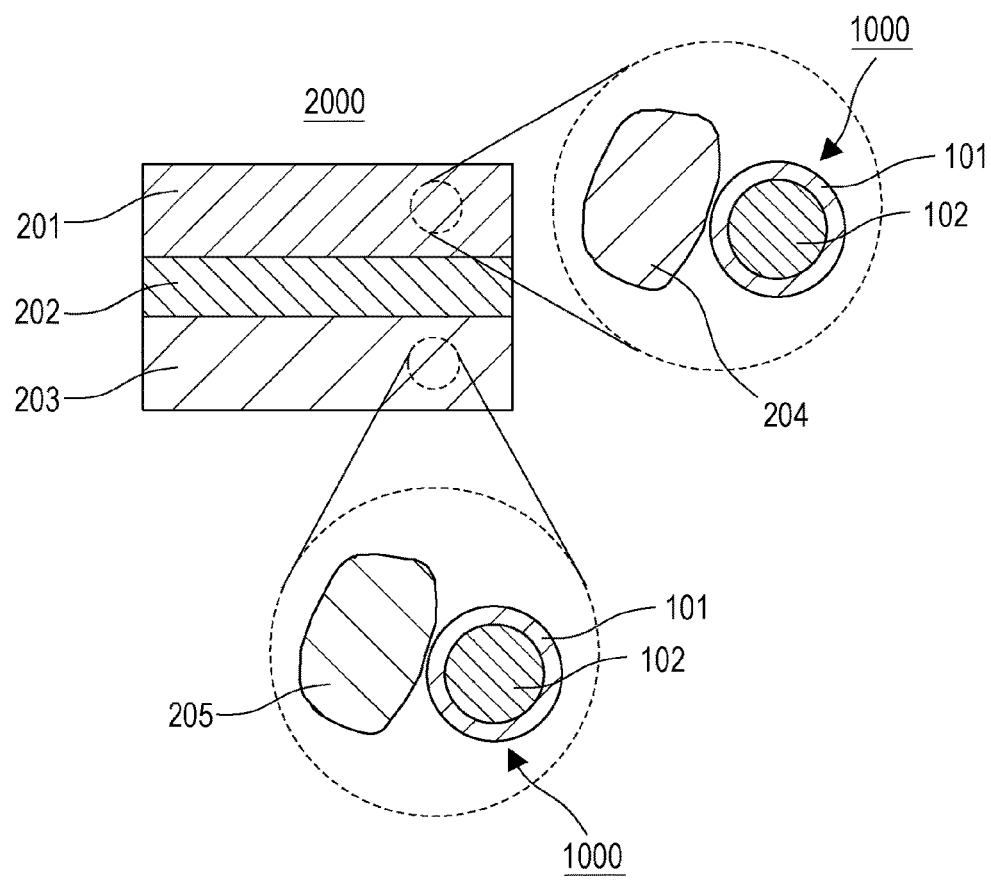
FIG. 2 is a cross-sectional view schematically illustrating the structure of a battery according to Embodiment 2.

FIG. 2 is a cross-sectional view schematically illustrating the structure of a battery 2000 according to Embodiment 2.

The battery 2000 in Embodiment 2 includes a positive electrode 201, a negative electrode 203, and an electrolyte layer 202.

The positive electrode 201 contains positive electrode active material particles 204 and the sulfide solid electrolyte material 1000.

The electrolyte layer 202 is disposed between the positive electrode 201 and the negative electrode 203.

The electrolyte layer 202 contains an electrolyte material (e.g., solid electrolyte material).

The negative electrode 203 contains negative electrode active material particles 205 and the sulfide solid electrolyte material 1000.

The above-described structure can further suppress electrolysis at the boundary surface where the sulfide solid electrolyte material is in contact with the positive or negative electrode active material. This can further improve the charge/discharge characteristics of the battery.

The positive electrode 201 contains a material having characteristics of occluding and releasing metal ions (e.g., lithium ions). The positive electrode 201 contains, for example, a positive electrode active material (e.g., positive electrode active material particles 204).

Examples of the positive electrode active material include lithium-containing transition metal oxides (e.g., Li(NiCoAl)O$_2$ and LiCoO$_2$), transition metal fluorides, polyanion and fluorinated polyanion materials, transition metal sulfides, transition metal oxyfluorides, transition metal oxysulfides, and transition metal oxynitrides. In particular, the use of a lithium-containing transition metal oxide as the positive electrode active material can reduce the manufacturing cost and can increase the average discharge voltage. In the case of using a positive electrode active material having a high average reaction voltage, the electrolysis-suppressing effect by the sulfide solid electrolyte material 1000 is further highly enhanced.

The positive electrode active material particles 204 may have a median diameter of 0.1 μm or more and 100 μm or less. A median diameter of the positive electrode active material particles 204 of smaller than 0.1 μm causes a risk of failing to form a good dispersion state of the positive electrode active material particles 204 and the sulfide solid electrolyte material in the positive electrode. As a result, the charge/discharge characteristics of the battery are deteriorated. In contrast, a median diameter of the positive electrode active material particles 204 of larger than 100 μm slows the dispersion of lithium in the positive electrode active material particles 204. Accordingly, high output operation of the battery may be difficult.

The positive electrode active material particles 204 may have a median diameter larger than that of the sulfide solid electrolyte material. In such a case, a good dispersion state of the positive electrode active material particles 204 and the sulfide solid electrolyte material can be formed.

Regarding the volume ratio "v:100−v" of the positive electrode active material particles 204 and the sulfide solid electrolyte material contained in the positive electrode 201, the value of v may satisfy the condition: 30≤v≤95. If the value of v is lower than 30, it may be difficult to secure a sufficient energy density of the battery. If the value of v is higher than 95, high output operation may be difficult.

The positive electrode 201 may have a thickness of 10 to 500 μm. If the thickness of the positive electrode is smaller than 10 μm, it may be difficult to secure a sufficient energy density of the battery. If the thickness of the positive electrode is higher than 500 μm, high output operation may be difficult.

In Embodiment 2, the positive electrode may contain a sulfide solid electrolyte material and a positive electrode active material. In such a case, the positive electrode active material may be Li(NiCoAl)O$_2$.

The above-described structure can further increase the energy density of the battery.

Furthermore, in Embodiment 2, the positive electrode may contain a sulfide solid electrolyte material and a positive electrode active material. In such a case, the positive electrode active material may be LiCoO$_2$.

The above-described structure can further increase the energy density of the battery.

The electrolyte layer 202 contains an electrolyte material. The electrolyte material is, for example, a solid electrolyte material. That is, the electrolyte layer 202 may be a solid electrolyte layer.

The solid electrolyte layer may be constituted of only the sulfide solid electrolyte material 1000.

Alternatively, the solid electrolyte layer may be constituted of only a sulfide solid electrolyte material different from the sulfide solid electrolyte material 1000. Examples of the sulfide solid electrolyte material different from the sulfide solid electrolyte material 1000 include Li$_2$S—P$_2$S$_5$, Li$_2$S—SiS$_2$, Li$_2$S—B$_2$S$_3$, Li$_2$S—GeS$_2$, Li$_{3.25}$Ge$_{0.25}$P$_{0.75}$S$_4$, and Li$_{10}$GeP$_2$S$_{12}$; and those prepared by adding LiX (X: F, Cl, Br, or I), Li$_2$O, MO$_q$, or Li$_p$MO$_q$ (M: P, Si, Ge, B, Al, Ga, In, Fe, or Zn; and p, q: natural number) thereto.

The solid electrolyte layer may contain both the sulfide solid electrolyte material 1000 and the above-mentioned sulfide solid electrolyte material different from the sulfide solid electrolyte material 1000. In such a case, both materials may be uniformly dispersed. Alternatively, a layer made of the sulfide solid electrolyte material 1000 and a layer made of a sulfide solid electrolyte material different from the sulfide solid electrolyte material 1000 may be successively arranged in the stacking direction of the battery.

For example, a positive electrode, a layer made of the sulfide solid electrolyte material 1000, a layer made of a sulfide solid electrolyte material different from the sulfide solid electrolyte material 1000, and a negative electrode may be stacked in this order. This can suppress electrolysis in the positive electrode.

The solid electrolyte layer may have a thickness of 1 μm or more and 100 μm or less. A thickness of the solid electrolyte layer of smaller than 1 μm enhances a risk of short-circuiting between the positive electrode 201 and the negative electrode 203. In contrast, if the thickness of the solid electrolyte layer is larger than 100 μm, high output operation may be difficult.

The negative electrode 203 contains a material having characteristics of occluding and releasing metal ions (e.g., lithium ions). The negative electrode 203 contains, for example, a negative electrode active material (e.g., negative electrode active material particles 205).

Examples of the negative electrode active material include metal materials, carbon materials, oxides, nitrides, tin compounds, and silicon compounds. The metal material may be a simple metal substance or an alloy. Examples of the metal material include lithium metal and lithium alloys. Examples of the carbon material include natural graphite, coke, carbon during graphitization, carbon fibers, spherical carbon, artificial graphite, and amorphous carbon. From the viewpoint of content density, silicon (Si), tin (Sn), silicon compounds, and tin compounds can be preferably used. In the case of using a negative electrode active material having a low average reaction voltage, the electrolysis-suppressing effect by the sulfide solid electrolyte material 1000 is further highly enhanced.

The negative electrode active material particles 205 may have a median diameter of 0.1 μm or more and 100 μm or less. A median diameter of the negative electrode active material particles 205 of smaller than 0.1 μm causes a risk of failing to form a good dispersion state of the negative electrode active material particles 205 and the sulfide solid electrolyte material 1000 in the negative electrode. This deteriorates the charge/discharge characteristics of the battery. In contrast, a median diameter of the negative electrode active material particles 205 of larger than 100 μm slows the dispersion of lithium in the negative electrode active material particles 205. Accordingly, high output operation of the battery may be difficult.

The negative electrode active material particles 205 may have a median diameter larger than that of the sulfide solid electrolyte material 1000. This allows formation of a good dispersion state of the negative electrode active material particles 205 and the sulfide solid electrolyte material.

Regarding the volume ratio "v:100−v" of the negative electrode active material particles 205 and the sulfide solid electrolyte material 1000 contained in the negative electrode 203, the value of v may satisfy the condition: 30≤v≤95. If the value of v is lower than 30, it may be difficult to secure a sufficient energy density of the battery. If the value of v is higher than 95, high output operation may be difficult.

The negative electrode 203 may have a thickness of 10 μm or more and 500 μm or less. If the thickness of the negative electrode is smaller than 10 μm, it may be difficult to secure a sufficient energy density of the battery. If the thickness of the negative electrode is higher than 500 μm, high output operation may be difficult.

At least one of the positive electrode 201 and the negative electrode 203 may contain a sulfide solid electrolyte material different from the sulfide solid electrolyte material 1000, in order to enhance the ionic conductivity. Examples of the sulfide solid electrolyte material different from the sulfide solid electrolyte material 1000 include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$; and those prepared by adding LiX (X: F, Cl, Br, or I), $Li_2O$, $MO_q$, or $Li_pMO_q$ (M: P, Si, Ge, B, Al, Ga, In, Fe, or Zn; and p, q: natural number) thereto.

At least one of the positive electrode 201, the electrolyte layer 202, and the negative electrode 203 may contain an oxide solid electrolyte, in order to enhance the ionic conductivity. Examples of the oxide solid electrolyte include NASICON-type solid electrolytes, such as $LiTi_2(PO_4)_3$ and element substitutes thereof; $(LaLi)TiO_3$ perovskite-type solid electrolyte; LISICON-type solid electrolytes, such as $Li_{14}ZnGe_4O_{16}$, $Li_4SiO_4$, and $LiGeO_4$ and element substitutes thereof; garnet-type solid electrolytes, such as $Li_7La_3Zr_2O_{12}$ and element substitutes thereof; $Li_3N$ and H substitutes thereof; and $Li_3PO_4$ and N substitutes thereof.

At least one of the positive electrode 201, the electrolyte layer 202, and the negative electrode 203 may contain an organic polymer solid electrolyte, in order to enhance the ionic conductivity. The organic polymer solid electrolyte can be, for example, a compound of a polymer and a lithium salt. The polymer may have an ethylene oxide structure. A polymer having an ethylene oxide structure can contain a large amount of a lithium salt and can further enhance the ionic conductivity. Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. These lithium salts may be used alone or as a mixture of two or more thereof.

At least one of the positive electrode 201, the electrolyte layer 202, and the negative electrode 203 may contain a nonaqueous electrolyte solution, a gel electrolyte, and an ionic liquid, in order to facilitate delivery and receipt of lithium ions and to enhance the output characteristics of the battery.

The nonaqueous electrolyte solution contains a nonaqueous solvent and a lithium salt dissolved in the nonaqueous solvent. Examples of the nonaqueous solvent include cyclic carbonate solvents, chain carbonate solvents, cyclic ether solvents, chain ether solvents, cyclic ester solvents, chain ester solvents, and fluorine solvents. Examples of the cyclic carbonate solvent include ethylene carbonate, propylene carbonate, and butylene carbonate. Examples of the chain carbonate solvent include dimethyl carbonate, ethyl methyl carbonate, and diethyl carbonate. Examples of the cyclic ether solvent include tetrahydrofuran, 1,4-dioxane, and 1,3-dioxolane. Examples of the chain ether solvent include 1,2-dimethoxyethane and 1,2-diethoxyethane. Examples of the cyclic ester solvent include γ-butyrolactone. Examples of the chain ester solvent include methyl acetate. Examples of the fluorine solvent include fluoroethylene carbonate, methyl fluoropropionate, fluorobenzene, fluoroethyl methyl carbonate, and fluorodimethylene carbonate. These nonaqueous solvents may be used alone or in combination of two or more thereof. The nonaqueous electrolyte solution may contain at least one fluorine solvent selected from the group consisting of fluoroethylene carbonate, methyl fluoropropionate, fluorobenzene, fluoroethyl methyl carbonate, and fluorodimethylene carbonate. Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. These lithium salts may be used alone or a mixture of two or more thereof. The concentration of the lithium salt is, for example, in a range of 0.5 to 2 mol/L.

A polymer material impregnated with a nonaqueous electrolyte solution can be used as the gel electrolyte. Examples of the polymer material include poly(ethylene oxide), polyacrylnitrile, poly(vinylidene fluoride), poly(methyl methacrylate), and polymers having ethylene oxide bonds.

The cation constituting the ionic liquid may be, for example, an aliphatic chain quaternary salt, such as tetraalkylammonium and tetraalkylphosphonium; an aliphatic cyclic ammonium, such as pyrrolidiniums, morpholiniums, imidazoliniums, tetrahydropyrimidiniums, piperaziniums, and piperidiniums; or a nitrogen-containing aromatic heterocyclic cation, such as pyridiniums and imidazoliums. The anion constituting the ionic liquid may be, for example, $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, or $C(SO_2CF_3)_3^-$. Furthermore, the ionic liquid may contain a lithium salt.

At least one of the positive electrode 201, the electrolyte layer 202, and the negative electrode 203 may contain a binder in order to enhance the adhesion between the particles. The binder is used for enhancing the binding properties of the materials constituting the electrode. Examples of the binder include poly(vinylidene fluoride), polytetrafluoroethylene, polyethylene, polypropylene, aramid resins, polyamide, polyimide, polyamideimide, polyacrylnitrile, poly(acrylic acid), poly(methyl acrylate), poly(ethyl acrylate), poly(hexyl acrylate), poly(methacrylic acid), poly(methyl methacrylate), poly(ethyl methacrylate), poly(hexyl methacrylate), poly(vinyl acetate), polyvinylpyrrolidone, polyether, polyethersulfone, hexafluoropolypropylene, styrene butadiene rubber, and carboxymethyl cellulose. The binder can be a copolymer of two or more materials selected from tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. Alternatively, a mixture of two or more selected from these binders may be used.

The battery in Embodiment 2 can be formed to have any shape, such as a coin-like, cylindrical, rectangular, sheet-like, button-like, flat, or laminar shape.

Embodiment 3

Embodiment 3 will now be described. The explanation duplicated with Embodiment 1 or 2 is appropriately omitted.

Figure 4:
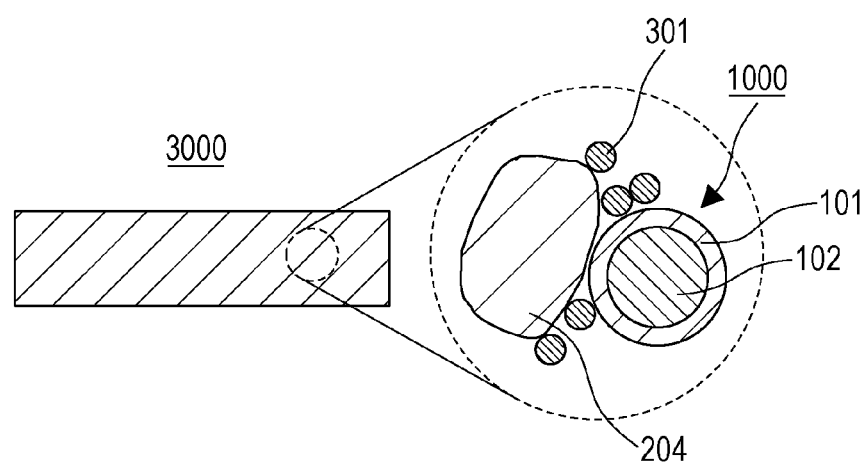
FIG. 4 is a cross-sectional view schematically illustrating the structure of a positive electrode according to Embodiment 3.

FIG. 4 is a cross-sectional view schematically illustrating the structure of a positive electrode 3000 according to Embodiment 3.

The positive electrode 3000 according to Embodiment 3 includes the sulfide solid electrolyte material 1000 described in Embodiment 1, positive electrode active material particles 204, and a conductive assistant 301. In other words, the positive electrode material contained in the positive electrode 3000 of Embodiment 3 contains the sulfide solid electrolyte material 1000 described in Embodiment 1, positive electrode active material particles 204, and a conductive assistant 301.

The details of the effects of the above will now be described.

Sulfide solid electrolyte materials do not contain organic solvents, such as organic electrolyte solutions, which are decomposed at high potential, and therefore have been conceived to have broad potential windows, i.e., to be stable for potentials and not to be oxidatively decomposed. However, the present inventors have diligently studied and, as a result, have found that sulfide solid electrolyte materials are very slightly oxidatively decomposed in high potential regions. The inventors have also found that in the case of a positive electrode containing a conductive assistant, the charge/discharge efficiency is decreased by influence of the oxidative decomposition of the sulfide solid electrolyte material. The details will now be described in detail.

Figure 5:
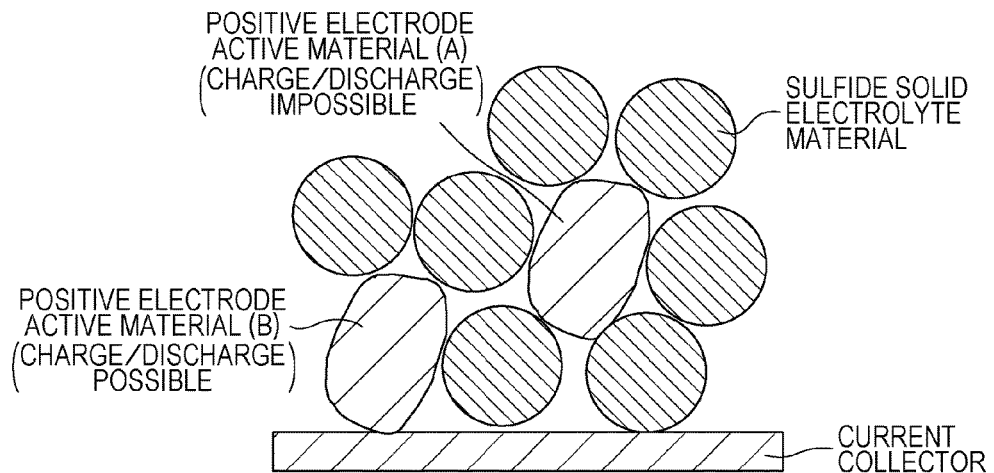
FIG. 5 is a cross-sectional view schematically illustrating the structure of a positive electrode not containing any conductive assistant.

FIG. 5 is a cross-sectional view schematically illustrating the structure of a positive electrode not containing any conductive assistant.

Figure 6:
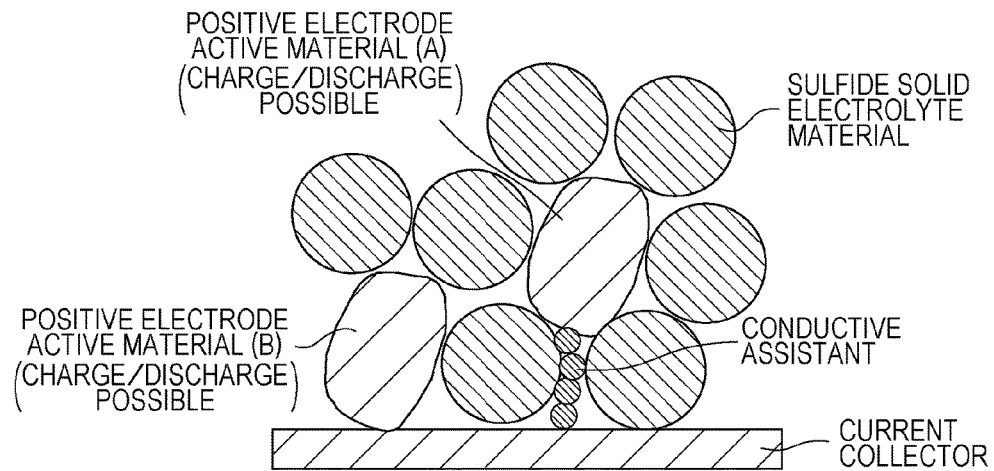
FIG. 6 is a cross-sectional view schematically illustrating the structure of a positive electrode containing a conductive assistant.

FIG. 6 is a cross-sectional view schematically illustrating the structure of a positive electrode containing a conductive assistant.

The positive electrode containing a sulfide solid electrolyte material includes a current collector, a positive electrode active material, and the sulfide solid electrolyte material. In order to obtain a charged state of the positive electrode active material, it is necessary to supply electrons from the positive electrode active material to the current collector.

As shown in FIG. 5, even if the positive electrode does not contain any conductive assistant, a positive electrode active material (B) being in contact with the current collector can supply electrons to the current collector. However, a positive electrode active material (A) surrounded by a sulfide solid electrolyte material having electronic insulation properties cannot supply electrons to the current collector, resulting in no charging.

In contrast, as shown in FIG. 6, in the case of a positive electrode containing a conductive assistant, it is possible to supply electrons from the positive electrode active material (A) to the current collector through the conductive assistant having electron conductivity. Thus, though the positive electrode active material (A) is surrounded by a sulfide solid electrolyte material, charging is possible, resulting in an increase in charge capacity.

At the same time, in the case of a positive electrode containing a conductive assistant, electrons are supplied also from the sulfide solid electrolyte material to the current collector through the conductive assistant. Accordingly, an oxidative decomposition reaction occurs at the boundary surface between the conductive assistant and the sulfide solid electrolyte material. As a result, the charge is consumed by the oxidative decomposition reaction, resulting in a decrease in charge/discharge efficiency.

Regarding this problem, the decrease in charge/discharge efficiency can be prevented by using the sulfide solid electrolyte material 1000 of the present disclosure.

The sulfide solid electrolyte material 1000 of the present disclosure includes an oxide phase 101 on the surface of the sulfide phase 102. The oxidative decomposition of the sulfide solid electrolyte material is caused by cleavage of sulfur binding having low electrical stability. The sulfide solid electrolyte material of the present disclosure has oxygen binding, of which the binding force is stronger than that of sulfur binding, in the surface layer and therefore has high electrical stability and is hardly oxidatively decomposed.

That is, a positive electrode containing a positive electrode active material, the sulfide solid electrolyte material of the present disclosure, and a conductive assistant can increase the charge capacity and can suppress the oxidative decomposition reaction of the sulfur binding and the conductive assistant boundary surface to suppress the reduction in charge/discharge efficiency.

Herein, the oxygen-to-sulfur elemental ratio measured by XPS depth profiling at the outermost surface of the oxide phase 101 is denoted by "x".

When the condition $1.28 \leq x \leq 4.06$ is satisfied, the above-described effects can be sufficiently achieved.

When the condition $x < 1.28$ is satisfied, the oxygen-to-sulfur elemental ratio at the outermost surface of the sulfide solid electrolyte material (i.e., the outermost surface of the oxide phase 101) is not sufficiently increased. In other words, the ratio of oxygen binding at the outermost surface is not sufficiently increased. Accordingly, the oxidative decomposition reaction occurring at the boundary surface between the conductive assistant and the sulfide solid electrolyte material cannot be sufficiently suppressed. Therefore, the reduction in charge/discharge efficiency cannot be sufficiently suppressed.

In contrast, satisfaction of the condition $1.28 \leq x$ can sufficiently increase the oxygen-to-sulfur elemental ratio at the outermost surface of the sulfide solid electrolyte material (i.e., the outermost surface of the oxide phase 101). This can sufficiently increase the ratio of oxygen binding at the outermost surface. Accordingly, the oxidative decomposition reaction occurring at the boundary surface between the conductive assistant and the sulfide solid electrolyte material can be sufficiently suppressed. Therefore, the reduction in charge/discharge efficiency can be sufficiently suppressed.

Figure 7A:
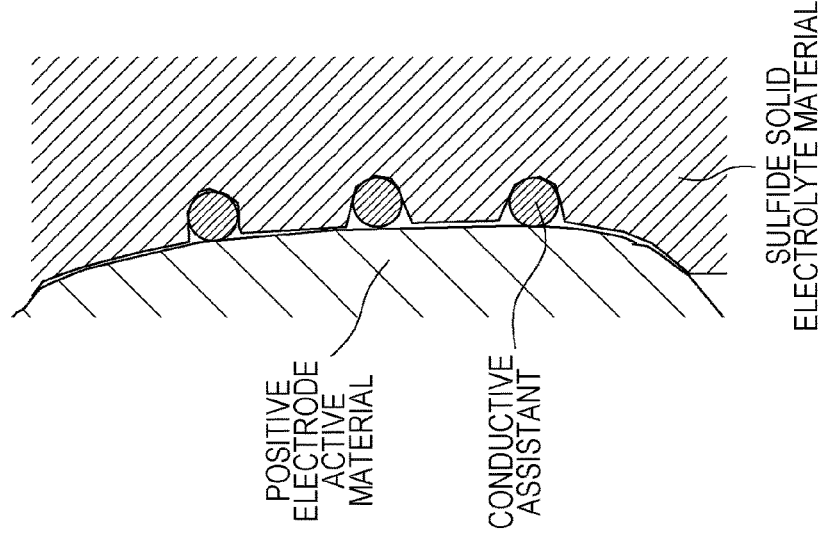
FIGS. 7A and 7B are cross-sectional views each schematically illustrating the structure of a boundary surface between the positive electrode active material and the sulfide solid electrolyte material.
Figure 7B:
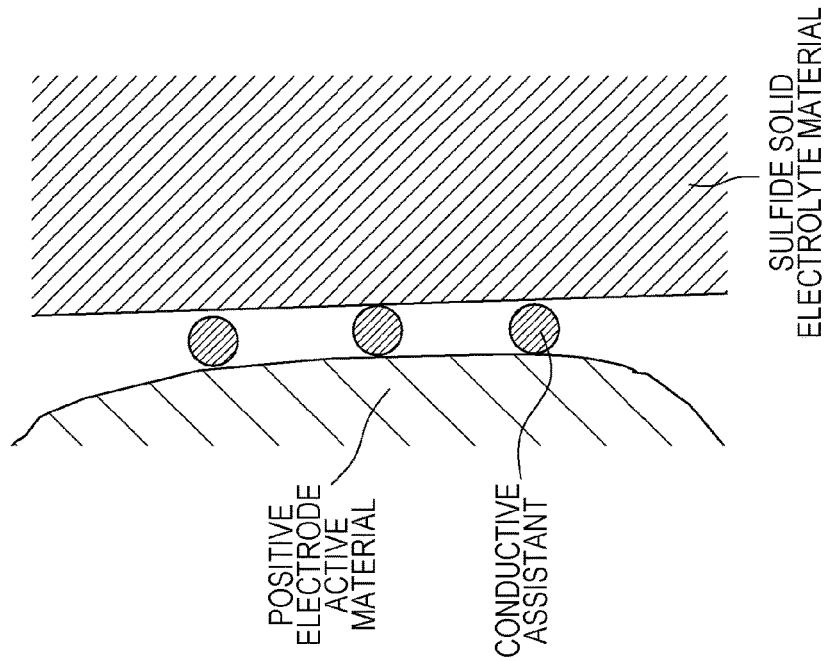

FIGS. 7A and 7B are each a cross-sectional view schematically illustrating the structure of the boundary surface between the positive electrode active material and the sulfide solid electrolyte material.

FIG. 7A shows a boundary surface when the value of x is higher than 4.06; and FIG. 7B shows a boundary surface when the value of x is not higher than 4.06.

When the condition $x>4.06$ is satisfied, the oxygen-to-sulfur elemental ratio at the outermost surface of the sulfide solid electrolyte material (i.e., the outermost surface of the oxide phase 101) is excessively increased. In other words, the ratio of oxygen binding at the outermost surface of the sulfide solid electrolyte material is excessively increased. The excessive presence of oxygen binding deteriorates the flexibility of the outermost surface of the sulfide solid electrolyte material. Accordingly, as shown in FIG. 7A, the sulfide solid electrolyte material cannot be deformed along the shape of the conductive assistant. Accordingly, a boundary surface having high adhesion is not formed, resulting in failing to deliver and receive lithium ions between the positive electrode active material and the sulfide solid electrolyte material. As a result, the charging characteristics are deteriorated.

In contrast, satisfaction of the condition $x \leq 4.06$ provides sufficient flexibility to the outermost surface of the sulfide solid electrolyte material. Accordingly, as shown in FIG. 7B, the sulfide solid electrolyte material can deform along the shape of the conductive assistant lying between the positive electrode active material and the sulfide solid electrolyte material. Therefore, a boundary surface having high adhesion is formed to allow delivery and receipt of lithium ions between the positive electrode active material and the sulfide solid electrolyte material.

Examples of the conductive assistant include graphites, such as natural graphite and artificial graphite; carbon blacks, such as acetylene black and Ketjen black; conductive fibers, such as carbon fibers and metal fibers; metal powders, such as carbon fluoride and aluminum; conductive whiskers, such as zinc oxide and potassium titanate; conductive metal oxides, such as titanium oxide; and conductive polymers, such as polyaniline, polypyrrole, and polythiophene.

The conductive assistant may be acetylene black.

Acetylene black has high electron conductivity and has a small particle diameter to show high dispersibility. Accordingly, the charging characteristics of the battery can be further enhanced. In addition, the cost can be reduced.

The positive electrode 3000 in Embodiment 3 may be used to assemble a battery.

That is, the battery in Embodiment 3 includes the positive electrode 3000, a negative electrode, and an electrolyte layer.

The electrolyte layer is disposed between the positive electrode 3000 and the negative electrode.

The above-described structure can realize a battery having further increased charge capacity.

The components (such as negative electrode and electrolyte) of the battery in Embodiment 3 may be the same as those of the battery in Embodiment 2.

EXAMPLES

The present disclosure will now be described in detail using examples and comparative examples.

Example 1

[Production of Sulfide Solid Electrolyte Material]

$Li_2S$ and $P_2S_5$ were weighed at a molar ratio of $Li_2S:P_2S_5=80:20$ in an argon glove box under an Ar atmosphere having a dew point of $-60°$ C. or less and were pulverized and mixed in a mortar. Subsequently, the mixture was subjected to milling treatment with a planetary ball mill at 510 rpm for 10 hours to give a glassy solid electrolyte. The glassy solid electrolyte was heat treated in an inert atmosphere at $270°$ C. for 2 hours to give a glass-ceramic solid electrolyte $Li_2S$—$P_2S_5$.

The resulting $Li_2S$—$P_2S_5$ (300 mg) and an oxidizing agent $KMnO_4$ (5.4 mg) were then placed in an electric furnace and were heat treated at $350°$ C. for 12 hours to obtain a sulfide solid electrolyte material having an oxide phase as the surface layer of the particle of Example 1.

[Production of Positive Electrode Mixture]

The sulfide solid electrolyte material of Example 1 and a positive electrode active material $Li(NiCoAl)O_2$ (hereinafter referred to as NCA) were weighed at a weight ratio of 30:70 in an argon glove box and were mixed with an agate mortar to produce a positive electrode mixture of Example 1.

Example 2

A sulfide solid electrolyte material of Example 2 was prepared as in Example 1 except that the addition amount of the oxidizing agent $KMnO_4$ was 7.2 mg.

A positive electrode mixture of Example 2 was prepared as in Example 1 except that the sulfide solid electrolyte material of Example 2 was used.

Example 3

A sulfide solid electrolyte material of Example 3 was prepared as in Example 1 except that the addition amount of the oxidizing agent $KMnO_4$ was 8.4 mg.

A positive electrode mixture of Example 3 was prepared as in Example 1 except that the sulfide solid electrolyte material of Example 3 was used.

Example 4

A sulfide solid electrolyte material of Example 4 was prepared as in Example 1 except that the addition amount of the oxidizing agent $KMnO_4$ was 15.0 mg and that the heat treatment was performed at $350°$ C. for 3 hours.

A positive electrode mixture of Example 4 was prepared as in Example 1 except that the sulfide solid electrolyte material of Example 4 was used.

Example 5

A sulfide solid electrolyte material of Example 5 was prepared as in Example 1 except that the addition amount of the oxidizing agent $KMnO_4$ was 15.0 mg.

A positive electrode mixture of Example 5 was prepared as in Example 1 except that the sulfide solid electrolyte material of Example 5 was used.

Example 6

A sulfide solid electrolyte material of Example 6 was prepared as in Example 1 except that the addition amount of the oxidizing agent $KMnO_4$ was 30.0 mg.

A positive electrode mixture of Example 6 was prepared as in Example 1 except that the sulfide solid electrolyte material of Example 6 was used.

Example 7

A sulfide solid electrolyte material of Example 7 was prepared as in Example 1 except that the addition amount of the oxidizing agent $KMnO_4$ was 36.0 mg.

A positive electrode mixture of Example 7 was prepared as in Example 1 except that the sulfide solid electrolyte material of Example 7 was used.

Example 8

A sulfide solid electrolyte material of Example 8 was prepared as in Example 1 except that the addition amount of the oxidizing agent $KMnO_4$ was 21.0 mg.

A positive electrode mixture of Example 8 was prepared as in Example 1 except that the sulfide solid electrolyte material of Example 8 was used.

Example 9

A sulfide solid electrolyte material of Example 9 was prepared as in Example 1 except that the addition amount of the oxidizing agent $KMnO_4$ was 15.0 mg.

A positive electrode mixture of Example 9 was prepared as in Example 1 except that the sulfide solid electrolyte material of Example 9 was used and that the positive electrode active material used was $LiCoO_2$ (hereinafter, referred to as LCO).

Example 10

$Li_2S$, $P_2S_5$, and $Li_2O$ were weighed at a molar ratio of $Li_2S:P_2S_5:Li_2O=56:24:20$ in an argon glove box under an Ar atmosphere having a dew point of $-60°$ C. or less as follows. $Li_2S$ and $P_2S_5$ were pulverized and mixed in a mortar and were then subjected to milling treatment with a planetary ball mill at 370 rpm for 20 hours. Subsequently, $Li_2O$ was added to the mixture, and the resulting mixture was further subjected to milling treatment with a planetary ball mill at 370 rpm for 40 hours to give a glassy solid electrolyte.

The resulting glassy solid electrolyte (300 mg) and an oxidizing agent $KMnO_4$ (60.0 mg) were then placed in an electric furnace and were heat treated at 350° C. for 12 hours to give a sulfide solid electrolyte material of Example 10 having an oxide phase as the surface layer of the particle.

A positive electrode mixture of Example 10 was prepared as in Example 1 except that the sulfide solid electrolyte material of Example 10 was used.

Example 11

$Li_2S$ and $P_2S_5$ were weighed at a molar ratio of $Li_2S:P_2S_5=75:25$ in an argon glove box under an Ar atmosphere having a dew point of $-60°$ C. or less and were pulverized and mixed in a mortar. Subsequently, the mixture was subjected to milling treatment with a planetary ball mill at 510 rpm for 10 hours to give a glassy solid electrolyte. The glassy solid electrolyte was heat treated in an inert atmosphere at 270° C. for 2 hours to give a glass-ceramic solid electrolyte $Li_2S-P_2S_5$.

The resulting $Li_2S-P_2S_5$ (300 mg) and an oxidizing agent $KMnO_4$ (15.0 mg) were then placed in an electric furnace and were heat treated at 350° C. for 12 hours to give a sulfide solid electrolyte material of Example 11 having an oxide phase as the surface layer of the particle.

A positive electrode mixture of Example 11 was prepared as in Example 1 except that the sulfide solid electrolyte material of Example 11 was used.

Example 12

The sulfide solid electrolyte material of Example 8 and a conductive assistant acetylene black were weighed at a weight ratio of 30:2 in an argon glove box and were mixed with an agate mortar to produce a mixture of Example 12.

Example 13

The sulfide solid electrolyte material of Example 8, a positive electrode active material $Li(NiCoAl)O_2$ (hereinafter referred to as NCA), and a conductive assistant acetylene black were weighed at a weight ratio of 30:70:2 in an argon glove box and were mixed with an agate mortar to produce a positive electrode mixture (positive electrode material) of Example 13.

Example 14

A positive electrode mixture of Example 14 was prepared as in Example 13 except that the sulfide solid electrolyte material of Example 11 was used.

Comparative Example 1

A sulfide solid electrolyte material of Comparative Example 1 was prepared as in Example 1 except that the oxidizing agent $KMnO_4$ was not added in the heat treatment of the glass-ceramic solid electrolyte.

A positive electrode mixture of Comparative Example 1 was prepared as in Example 1 except that the sulfide solid electrolyte material of Comparative Example 1 was used.

Comparative Example 2

A sulfide solid electrolyte material of Comparative Example 2 was prepared as in Example 1 except that the addition amount of the oxidizing agent $KMnO_4$ was 1.68 mg.

A positive electrode mixture of Comparative Example 2 was prepared as in Example 1 except that the sulfide solid electrolyte material of Comparative Example 2 was used.

Comparative Example 3

A sulfide solid electrolyte material of Comparative Example 3 was prepared as in Example 1 except that the addition amount of the oxidizing agent $KMnO_4$ was 4.2 mg.

A positive electrode mixture of Comparative Example 3 was prepared as in Example 1 except that the sulfide solid electrolyte material of Comparative Example 3 was used.

Comparative Example 4

A sulfide solid electrolyte material of Comparative Example 4 was prepared as in Example 1 except that the addition amount of the oxidizing agent $KMnO_4$ was 60.0 mg.
A positive electrode mixture of Comparative Example 4 was prepared as in Example 1 except that the sulfide solid electrolyte material of Comparative Example 4 was used.

Comparative Example 5

$Li_2S$, $P_2S_5$, and $Li_2O$ were weighed at a molar ratio of $Li_2S:P_2S_5:Li_2O=56:24:20$ in an argon glove box under an Ar atmosphere having a dew point of −60° C. or less as follows. $Li_2S$ and $P_2S_5$ were pulverized and mixed in a mortar and were then subjected to milling treatment with a planetary ball mill at 370 rpm for 20 hours. Subsequently, $Li_2O$ was added to the mixture, and the resulting mixture was further subjected to milling treatment with a planetary ball mill at 370 rpm for 40 hours to give a sulfide solid electrolyte material of Comparative Example 5 as a glassy solid electrolyte.
A positive electrode mixture of Comparative Example 5 was prepared as in Example 1 except that the sulfide solid electrolyte material of Comparative Example 5 was used.

Comparative Example 6

A sulfide solid electrolyte material of Comparative Example 6 was prepared as in Example 1 except that the oxidizing agent $KMnO_4$ was not added in the heat treatment of the glass-ceramic solid electrolyte.
A positive electrode mixture of Comparative Example 6 was prepared as in Example 1 except that the sulfide solid electrolyte material of Comparative Example 6 was used and that the positive electrode active material used was $LiCoO_2$.

Comparative Example 7

$Li_2S$ and $P_2S_5$ were weighed at a molar ratio of $Li_2S:P_2S_5=75:25$ in an argon glove box under an Ar atmosphere having a dew point of −60° C. or less and were pulverized and mixed in a mortar. Subsequently, the mixture was subjected to milling treatment with a planetary ball mill at 510 rpm for 10 hours to give a glassy solid electrolyte. The glassy solid electrolyte was heat treated in an inert atmosphere at 270° C. for 2 hours to give a sulfide solid electrolyte material of Comparative Example 7 as a glass-ceramic solid electrolyte ($Li_2S$—$P_2S_5$).
A positive electrode mixture of Comparative Example 7 was prepared as in Example 1 except that the sulfide solid electrolyte material of Comparative Example 7 was used.

Comparative Example 8

The sulfide solid electrolyte material of Comparative Example 1 and a conductive assistant acetylene black were weighed at a weight ratio of 30:2 in an argon glove box and were mixed with an agate mortar to produce a mixture of Comparative Example 8.

Comparative Example 9

A positive electrode mixture of Comparative Example 9 was prepared as in Example 13 except that the sulfide solid electrolyte material of Comparative Example 1 was used.

Comparative Example 10

A positive electrode mixture of Comparative Example 10 was prepared as in Example 13 except that the sulfide solid electrolyte material of Comparative Example 4 was used.

[Measurement of Oxygen-to-Sulfur Elemental Ratio]

The sulfide solid electrolyte materials of Examples 1 to 11 and Comparative Examples 1 to 7 were subjected to the following measurement.

That is, the produced sulfide solid electrolyte material was subjected to XPS depth profiling while being etched with C60 cluster ions. The oxygen-to-sulfur elemental ratio "x" of the outermost surface of the particle was measured before the etching. In addition, the oxygen-to-sulfur elemental ratio "y" at a position 32 nm, estimated from the $SiO_2$ sputtering rate, away from the outermost surface of the particle was measured. The ratio "x/y" of the oxygen-to-sulfur elemental ratio at the outermost surface of the particle to that at the position 32 nm away from the surface was calculated from the measured values "x" and "y".

The values of "x", "y", and "x/y" of the sulfide solid electrolyte materials of Examples 1 to 11 and Comparative Examples 1 to 7 were determined by the above-described procedure. The results are shown in Table 1 below.

[Production of Secondary Battery]

The positive electrode mixtures of Examples 1 to 11, 13, and 14 and Comparative Examples 1 to 7, 9, and 10 were subjected to the following process.

$Li_2S$—$P_2S_5$ (80 mg) and a positive electrode mixture (10 mg) were stacked in this order in an insulated outer cylinder and were pressure molded at 360 MPa to form a positive electrode and a solid electrolyte layer.

Subsequently, a metal In (thickness: 200 μm) was stacked on the solid electrolyte layer on the opposite side to the surface being in contact with the positive electrode, followed by pressure molding at 80 MPa to produce a layered product composed of a positive electrode, a solid electrolyte layer, and a negative electrode.

Current collectors of stainless steel were then disposed on the top and the bottom of the layered product, and a current collector lead was attached to each of the current collectors.

Lastly, the inside of the insulated outer cylinder was isolated and sealed from the outside atmosphere by an insulated ferrule to produce a battery.

Batteries of Examples 1 to 11, 13, and 14 and Comparative Examples 1 to 7, 9, and 10 were thus produced by the above-described process.

[Charging and Discharging Test]

The batteries of Examples 1 to 11 and Comparative Examples 1 to 7 were subjected to a charging and discharging test under the following conditions.

The batteries were each placed in a thermostat chamber of 25° C.

The battery was constant-current charged at a current value of 70 μA, 0.05C rate (20 hour rate) with respect to the theoretical capacity of the battery, and the charge was terminated when the voltage reached 3.7 V.

Subsequently, the battery was discharged at a current value of 70 μA, the same 0.05C rate as above, and the discharge was terminated when the voltage reached 1.9 V.

The discharge capacity (mAh/g) of each of the batteries of Examples 1 to 11 and Comparative Examples 1 to 7 was determined by the above-described procedure. The results are shown in Table 1 below.

TABLE 1

| | Positive electrode active material | O/S ratio x at outermost surface of particle | O/S ratio y at a depth of 32 nm | x/y | Discharge capacity mAh/g |
|---|---|---|---|---|---|
| Example 1 | NCA | 1.28 | 0.49 | 2.60 | 134.71 |
| Example 2 | NCA | 1.67 | 0.54 | 3.13 | 139.12 |
| Example 3 | NCA | 2.11 | 0.59 | 3.56 | 139.46 |
| Example 4 | NCA | 2.71 | 1.04 | 2.60 | 145.99 |
| Example 5 | NCA | 2.91 | 0.68 | 4.31 | 158.52 |
| Example 6 | NCA | 3.1 | 1.07 | 2.90 | 140.72 |
| Example 7 | NCA | 3.77 | 1.24 | 3.05 | 143.66 |
| Example 8 | NCA | 4.06 | 0.98 | 4.12 | 147.00 |
| Example 9 | LCO | 2.91 | 0.68 | 4.31 | 100.09 |
| Example 10 | NCA | 3.36 | 0.85 | 3.96 | 147.43 |
| Example 11 | NCA | 1.43 | 0.42 | 3.43 | 159.21 |
| Comparative Example 1 | NCA | 0.41 | 0.28 | 1.49 | 114.72 |
| Comparative Example 2 | NCA | 0.68 | 0.25 | 2.71 | 121.29 |
| Comparative Example 3 | NCA | 0.88 | 0.33 | 2.71 | 129.44 |
| Comparative Example 4 | NCA | 4.55 | 1.55 | 2.93 | 110.83 |
| Comparative Example 5 | NCA | 0.36 | 0.21 | 1.67 | 121.71 |
| Comparative Example 6 | LCO | 0.41 | 0.28 | 1.49 | 78.80 |
| Comparative Example 7 | NCA | 0.23 | 0.13 | 1.70 | 125.11 |

The batteries of Examples 13 and 14 and Comparative Examples 9 and 10 were subjected to a charging and discharging test under the following conditions.

The batteries were each placed in a thermostat chamber of 25° C.

The battery was constant-current charged at a current value of 68.6 µA, 0.05C rate (20 hour rate) with respect to the theoretical capacity of the battery, and the charge was terminated when the voltage reached 3.7 V.

Subsequently, the battery was discharged at a current value of 68.6 µA, the same 0.05C rate as above, and the discharge was terminated when the voltage reached 1.9 V.

The charge capacity (mAh/g) and the charge/discharge efficiency (%) (charge/discharge efficiency=discharge capacity/charge capacity) of each of the batteries of Examples 13 and 14 and Comparative Examples 9 and 10 were determined by the above-described procedure.

Subsequently, the difference in charge capacity and the difference in charge/discharge efficiency between a battery containing a conductive assistant and a battery not containing any conductive assistant were calculated. That is, the differences between the battery of Example 13 and the battery of Example 8, the differences between the battery of Example 14 and the battery of Example 11, the differences between the battery of Comparative Example 9 and the battery of Comparative Example 1, and the differences between the battery of Comparative Example 10 and the battery of Comparative Example 4 were calculated. The results are shown in Table 2 below.

TABLE 2

| | Subjects for calculating difference | Difference in charge capacity mAh/g | Difference in charge/discharge efficiency % |
|---|---|---|---|
| Example 13 | Example 8 | +17.5 | −3.39 |
| Example 14 | Example 11 | +37.1 | −4.21 |
| Comparative Example 9 | Comparative Example 1 | +10.2 | −7.91 |
| Comparative Example 10 | Comparative Example 4 | −24.2 | −15.6 |

Figure 3:
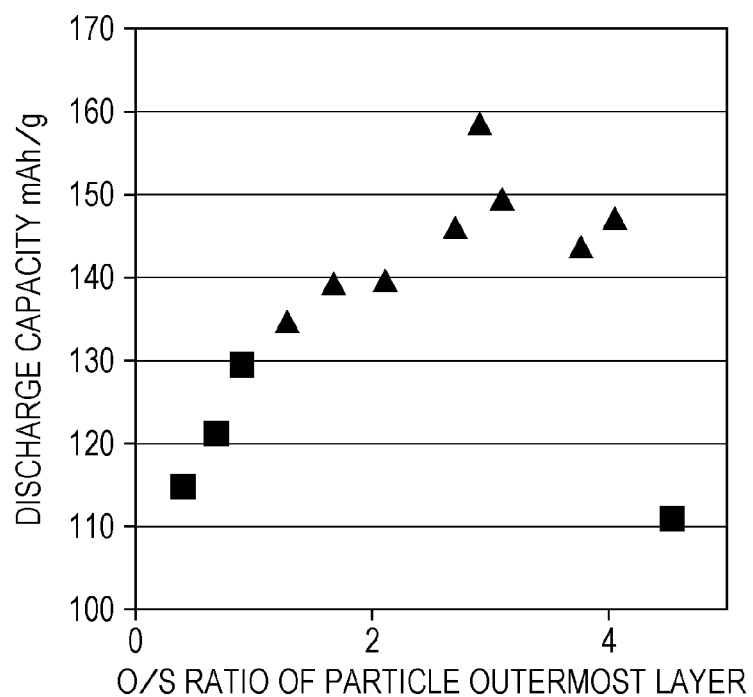
FIG. 3 is a graph showing a relationship between the oxygen-to-sulfur (O/S) ratio at the outermost surface of the particle and the discharge capacity.

FIG. 3 is a graph showing a relationship between the O/S ratio at the outermost surface of the particle and the discharge capacity.

FIG. 3 shows the relationship between the O/S ratio at the outermost surface of the particle and the discharge capacity in the batteries of Examples 1 to 8 and Comparative Examples 1 to 4.

In FIG. 3, the triangles show the results of Examples, and the squares show the results of Comparative Examples.

The results demonstrate the following effects.

The results of Examples 1 to 8 demonstrated that when the sulfide solid electrolyte material satisfies the conditions: 1.28≤x≤4.06 and x/y≥2.60, a high discharge capacity of 130 mAh/g or more is achieved.

The results of Examples 4 to 8 demonstrated that when the sulfide solid electrolyte material satisfies the conditions: 2.71≤x≤4.06 and x/y≥2.60, a significantly high discharge capacity of 140 mAh/g or more is achieved.

The results of Comparative Example 1 demonstrated that when the sulfide solid electrolyte material satisfies the conditions: x<1.28 and x/y<2.60, a discharge capacity of 130 mAh/g is not achieved.

The results of Comparative Examples 2 and 3 demonstrated that when the value x of the sulfide solid electrolyte material is less than 1.28, the discharge capacity is lower than 130 mAh/g even if the sulfide solid electrolyte material satisfies the condition: x/y≥2.60.

The results of Comparative Example 4 demonstrated that when the value x of the sulfide solid electrolyte material is higher than 4.06, the discharge capacity is lower than 130 mAh/g even if the sulfide solid electrolyte material satisfies the condition: x/y≥2.60.

The results of Comparative Example 5 demonstrated that uniform dispersion of oxygen in the sulfide solid electrolyte material with, for example, a ball mill cannot achieve a discharge capacity of 130 mAh/g or more.

The results of Example 10 and Comparative Example 5 demonstrated that even if oxygen is uniformly dispersed in the sulfide solid electrolyte material with, for example, a ball mill, a significantly high discharge capacity of 140 mAh/g or more can be achieved by providing an oxide phase as the surface layer.

The results of Example 9 and Comparative Example 6 demonstrated that even if $LiCoO_2$ is used as the positive electrode active material, the charge/discharge characteristics of the battery can be improved by using the sulfide solid electrolyte material of the present disclosure.

The results of Example 11 and Comparative Example 7 demonstrated that even if the composition of the sulfide solid electrolyte material as the base material has a molar ratio of $Li_2S$ and $P_2S_5$ of 75:25, a significantly high discharge capacity of 140 mAh/g or more can be achieved by providing an oxide phase as the surface layer. It was demonstrated that the structure and the composition of the sulfide solid electrolyte material as the base material are not limited to those having a molar ratio of $Li_2S$ and $P_2S_5$ of 80:20 and that even if a sulfide solid electrolyte material having other structure or composition is used as the base material, the effects of the present disclosure are achieved.

The results of Examples 13 and 14 demonstrated that the charge capacity is increased by adding a conductive assistant to the positive electrode. In addition, it was demonstrated that the reduction in charge/discharge efficiency is suppressed to be 5% or less.

The results of Comparative Example 9 demonstrated that the charge capacity is increased by adding a conductive assistant to the positive electrode, but the oxidative decomposition reaction of the sulfide solid electrolyte material is no sufficiently suppressed to cause a decrease of 5% or more in charge/discharge efficiency.

The results of Comparative Example 10 demonstrated that a boundary surface having high adhesion between the positive electrode active material and the sulfide solid electrolyte material cannot be formed by adding a conductive assistant to the positive electrode, resulting in a decrease in charge capacity and a decrease of 5% or more in charge/discharge efficiency.

[Evaluation of Electrical Stability]

The following process was performed using the mixtures of Example 12 and Comparative Example 8.

$Li_2S$—$P_2S_5$ (80 mg) and a mixture (10 mg) were stacked in this order in an insulated outer cylinder and were pressure molded at 360 MPa.

Subsequently, a metal Li (thickness: 300 μm) was stacked on the solid electrolyte layer on the opposite side to the surface being in contact with the mixture, followed by pressure molding at 20 MPa to produce a layered product composed of the mixture, the solid electrolyte layer, and the metal Li.

Current collectors of stainless steel were then disposed on the top and the bottom of the layered product, and a current collector lead was attached to each of the current collectors.

Lastly, the inside of the insulated outer cylinder was isolated and sealed from the outside atmosphere by an insulated ferrule to produce an electrochemical cell for evaluation of electrical stability.

Subsequently, the produced electrochemical cell was placed in a thermostat chamber of 25° C., and linear sweep voltammetry was performed under the following conditions.

The potential of the electrochemical cell was swept to the noble direction from the open circuit voltage at a rate of 1 mV/sec.

Figure 8:
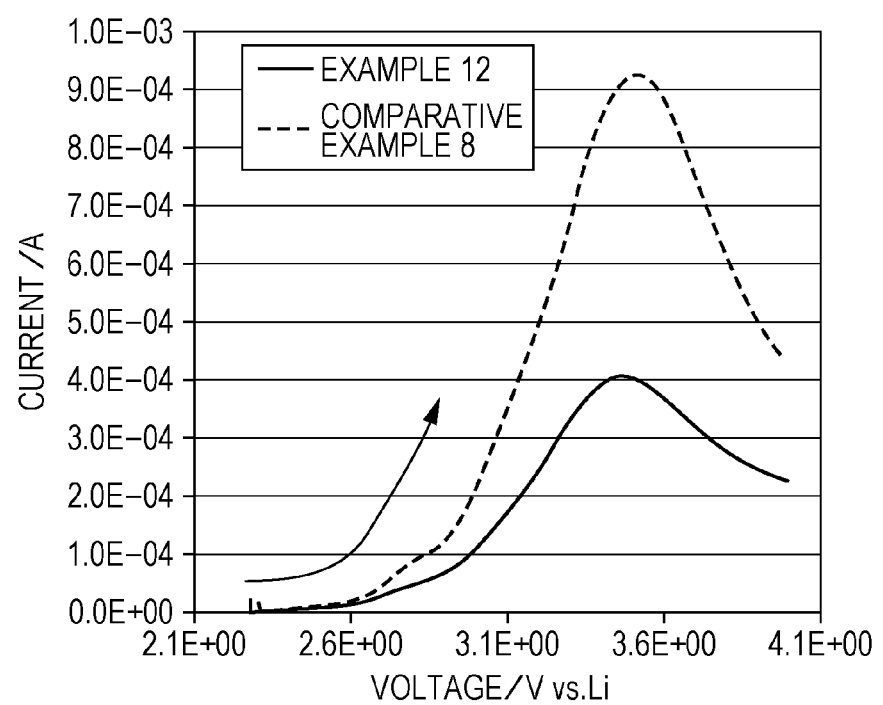
FIG. 8 is a graph showing the results of linear sweep voltammetry measurement in Example 12 and Comparative Example 8.

FIG. 8 is a graph showing the results of linear sweep voltammetry measurement of the electrochemical cells of Example 12 and Comparative Example 8.

In Comparative Example 8, an oxidation current peak of $9.2 \times 10^{-4}$ A derived from oxidative decomposition of the sulfide solid electrolyte material was observed at 3.5 V vs. Li.

In contrast, in Example 12, the oxidation current peak observed at 3.5 V vs. Li was $4.0 \times 10^{-4}$ A. This demonstrated that oxidative decomposition of the sulfide solid electrolyte material is notably suppressed in Example 12, compared with Comparative Example 8.

The battery of the present disclosure can be used as, for example, an all-solid lithium secondary battery.

What is claimed is:

1. A sulfide solid electrolyte material comprising:
   a sulfide phase containing a sulfide material; and
   an oxide phase containing an oxide formed by oxidation of the sulfide material, wherein
   the oxide phase is located on a surface of the sulfide phase; and
   the sulfide solid electrolyte material satisfies conditions:

$1.28 \leq x \leq 4.06$, and $x/y \geq 2.60$, where x denotes an oxygen-to-sulfur elemental ratio measured by X-ray photoelectron spectroscopy depth profiling at the outermost surface of the oxide phase; and
   y denotes an oxygen-to-sulfur elemental ratio measured by XPS depth profiling at a position 32 nm, estimated from an $SiO_2$ sputtering rate, away from the outermost surface of the oxide phase.

2. The sulfide solid electrolyte material according to claim 1, satisfying a condition: $2.71 \leq x \leq 4.06$.

3. The sulfide solid electrolyte material according to claim 1, wherein the sulfide material is $Li_2S$—$P_2S_5$.

4. A battery comprising:
   a positive electrode;
   a negative electrode; and
   an electrolyte layer disposed between the positive electrode and the negative electrode, wherein
   at least one of the positive electrode, the negative electrode, and the electrolyte layer contains a sulfide solid electrolyte material;
   the sulfide solid electrolyte material includes a sulfide phase containing a sulfide material and an oxide phase containing an oxide formed by oxidation of the sulfide material;
   the oxide phase is located on a surface of the sulfide phase; and
   the sulfide solid electrolyte material satisfies conditions:

$1.28 \leq x \leq 4.06$, and $x/y \geq 2.60$, where x denotes an oxygen-to-sulfur elemental ratio measured by XPS depth profiling at the outermost surface of the oxide phase; and
   y denotes an oxygen-to-sulfur elemental ratio measured by XPS depth profiling at a position 32 nm, estimated from an $SiO_2$ sputtering rate, away from the outermost surface of the oxide phase.

5. The battery according to claim 4, wherein
   the positive electrode contains the sulfide solid electrolyte material and a positive electrode active material; or
   the negative electrode contains the sulfide solid electrolyte material and a negative electrode active material.

6. The battery according to claim 5, wherein
   the positive electrode contains the sulfide solid electrolyte material and a positive electrode active material; and
   the positive electrode active material is $Li(NiCoAl)O_2$.

7. The battery according to claim 5, wherein
   the positive electrode contains the sulfide solid electrolyte material and a positive electrode active material; and
   the positive electrode active material is $LiCoO_2$.

8. The battery according to claim 5, wherein
   the positive electrode contains the sulfide solid electrolyte material, a positive electrode active material, and a conductive assistant.

9. The battery according to claim 8, wherein
   the conductive assistant is acetylene black.

10. A positive electrode material comprising:
    a sulfide solid electrolyte material;
    a positive electrode active material; and
    a conductive assistant, wherein the sulfide solid electrolyte material includes a sulfide phase containing a sulfide material and an oxide phase containing an oxide formed by oxidation of the sulfide material;

the oxide phase is located on a surface of the sulfide phase; and the sulfide solid electrolyte material satisfies conditions:

$1.28 \leq x \leq 4.06$, and $x/y \geq 2.60$, where x denotes an oxygen-to-sulfur elemental ratio measured by XPS depth profiling at the outermost surface of the oxide phase; and y denotes an oxygen-to-sulfur elemental ratio measured by XPS depth profiling at a position 32 nm, estimated from an $SiO_2$ sputtering rate, away from the outermost surface of the oxide phase.

11. The positive electrode material according to claim 10, wherein the conductive assistant is acetylene black.

* * * * *